United States Patent Office.

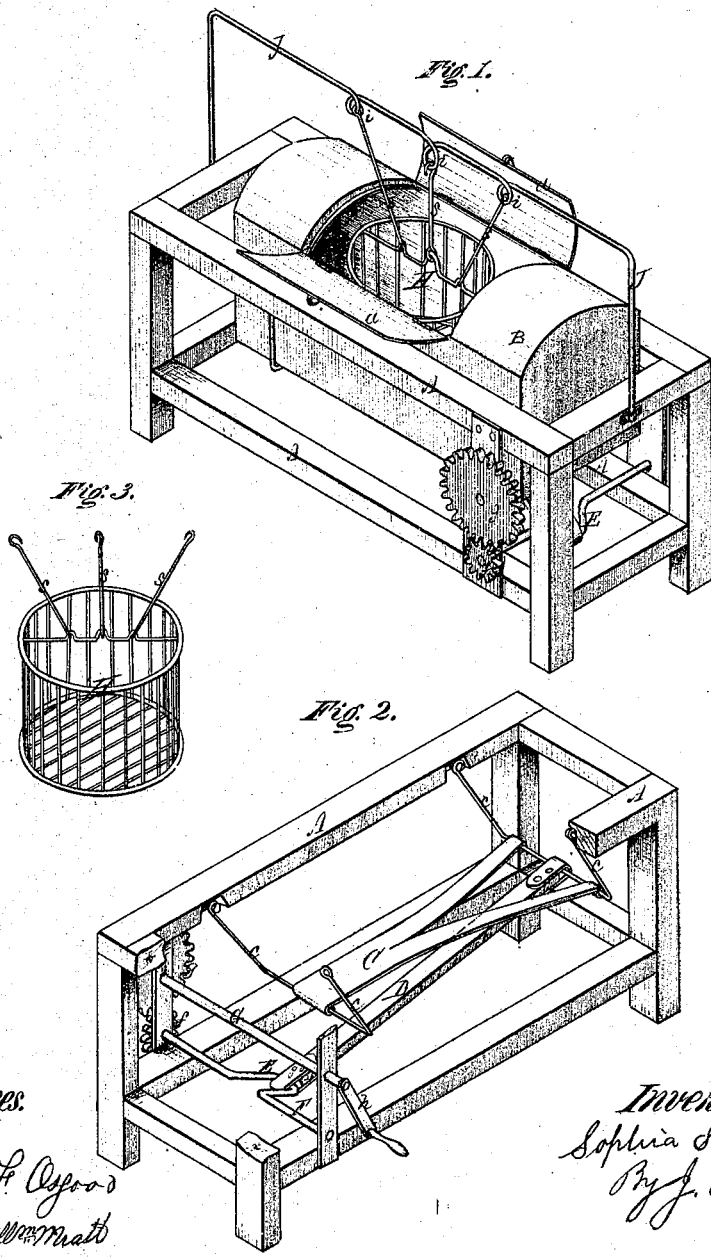

SOPHIA S. TUPPER, OF CHURCHVILLE, NEW YORK.

Letters Patent No. 105,742, dated July 26, 1870.

IMPROVED DISH-WASHING MACHINE.

The Schedule referred to in these Letters Patent and making part of the same.

*To all whom it may concern:*

Be it known that I, SOPHIA S. TUPPER, of Churchville, in the county of Monroe and State of New York, have invented a certain new and improved Machine for Washing Dishes, and applicable to other uses, of which the following is a specification.

Nature of the Invention.

This invention consists of a stationary basket or receptacle, situated inside of a vibrating water-tank, in such a manner that the body of water is carried through the dishes; also, in a swinging platform, for supporting the tank, as hereinafter described.

General Description.

In the drawing—

Figure 1 is a perspective view of my apparatus complete.

Figure 2, a similar view, the water-tank being removed.

Figure 3, a view of the basket in perspective.

A is the frame, of suitable form.

B is an elongated water-tank, having its top arched or convex, and provided with lids $a\ a$, of such width that, when closed, they leave a slot, in which rests the supports $s\ s$ of the basket H, that holds the dishes to be washed.

This tank rests upon a swinging carriage or platform, C, having pendent rods $c\ c$ hung to the frame.

The whole receives a longitudinal vibrating motion, through the medium of pitman D, driven by crank E of shaft F, which, in turn, receives motion, by means of the cog-wheels $f\ g$, from shaft G, situated above, and having a hand-crank, $h$, at one end. It will be seen that the water-tank is removable from the swing platform, so that another, for washing clothes or potatoes, or other articles, may be placed in its stead.

A rod or support, J, extends up from either end of the frame a sufficient height, and longitudinally over the center of the machine.

Midway between the two ends this support has bearings $i\ i\ i$, into which hooks, or otherwise connects, the supporting-rods $s\ s$, which hold the basket H, in such a manner that it will be held stationary while the tank moves under it. The basket is made of wire or other open material.

The operation is as follows:

The dishes, being placed in basket H, (preferably upright, and with the edges situated longitudinally,) the basket is suspended in the water of the tank, the covers of the latter closed, and the tank is then vibrated, alternately forth and back, by the crank, as before described. The basket being stationary, and the body of water movable bodily through the dishes, they soon become cleaned.

I am aware that dish-washing machines are common in which the dishes are stationary, and the water is put in motion by an agitator. I am also aware that the dishes themselves have been put in motion in still water. But neither of these plans is so effective as mine, where the dishes remain still, while the whole body of water moves through them by the simple motion of the tank itself. By this action, the current is uniform and powerful from beginning to close, while in other cases it is subject to impulse and irregularity. The rise and fall of the tank at the extremities of the stroke also has a good effect in cleaning the dishes, as the water is thereby deflected out of a straight and unwavering course.

My arrangement for operating the tank, and the making of the tank removable, I also believe to be new. The platform C and pendants $c\ c$ form fixtures of the machine, and the tank is simply placed thereon, and is removable at pleasure.

What I claim, and desire to secure by Letters Patent, is—

The arrangement of the stationary basket H, with its supports $s\ s$, the suspension-rod J, the vibrating water-tank B, and the swing platform C, and pendants $c\ c$, the whole operating in the manner and for the purpose specified.

In witness whereof I have hereunto signed my name in the presence of two subscribing witnesses.

SOPHIA S. TUPPER.

Witnesses:
G. WILLM. MIATT,
R. F. OSGOOD.